Patented Feb. 24, 1931

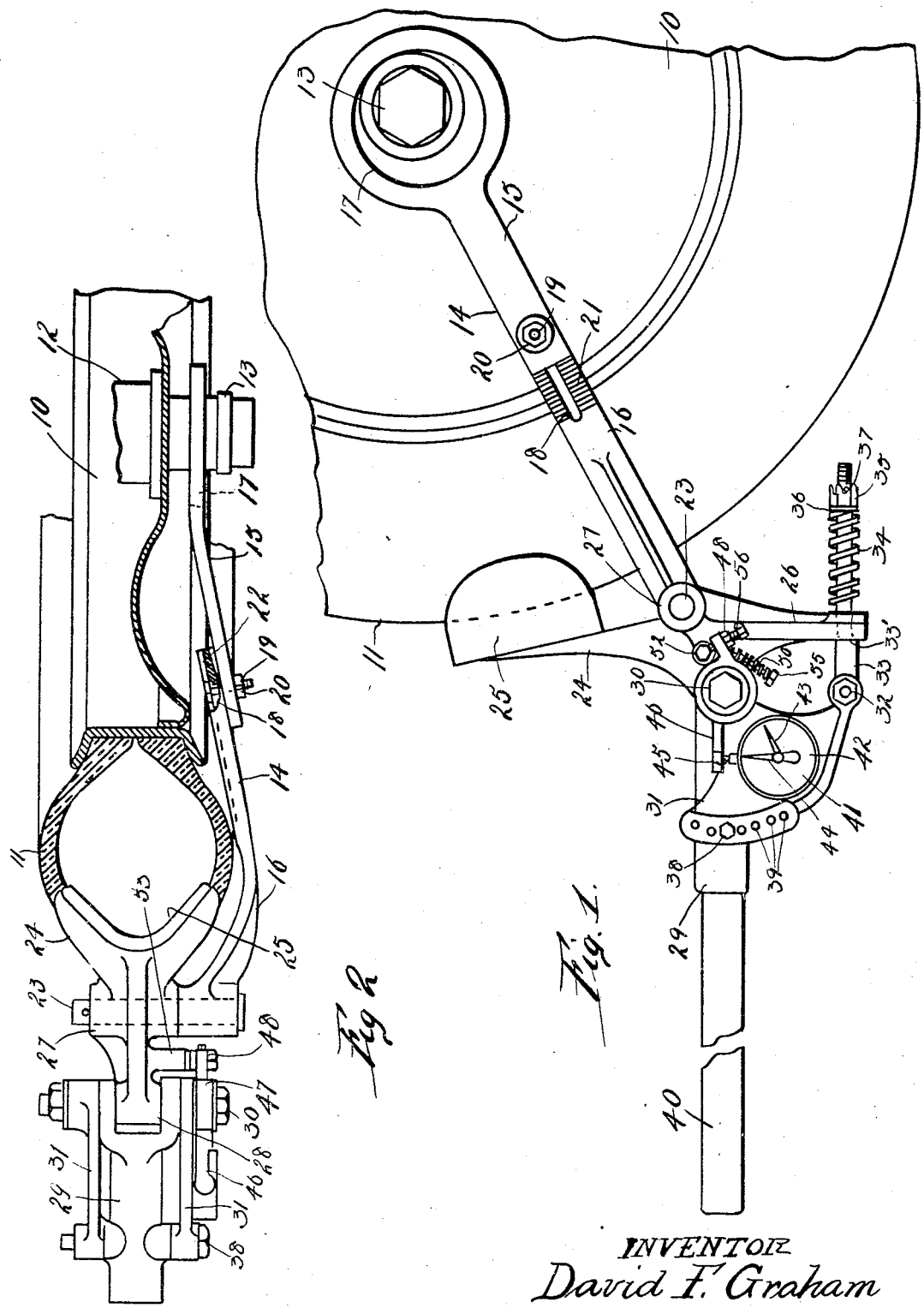

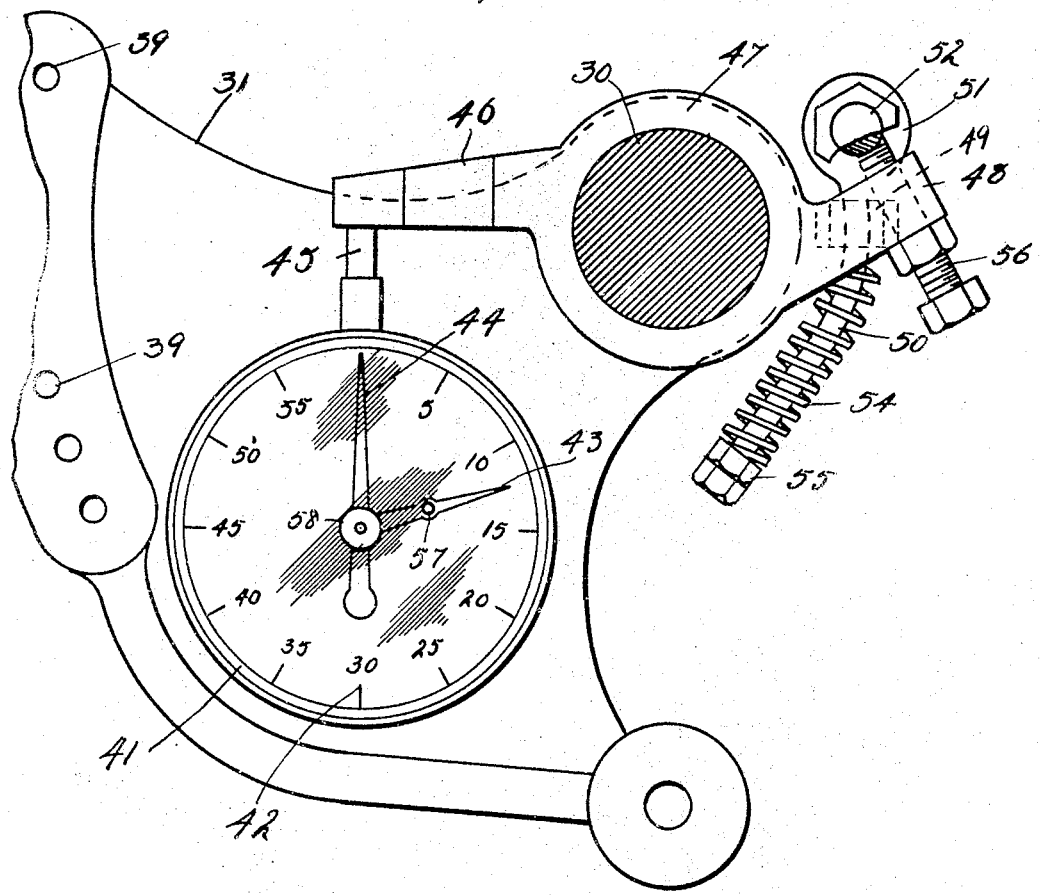

1,794,168

UNITED STATES PATENT OFFICE

DAVID F. GRAHAM, OF JERSEY SHORE, PENNSYLVANIA, ASSIGNOR TO ASA E. LINENDOLL, OF NORWALK, OHIO

BRAKE TESTER

Application filed September 8, 1927. Serial No. 218,147.

My invention relates to new and useful improvements in a brake tester, and has for its primary object to provide an exceedingly simple and effective device of this character which will permit an unskilled person to adjust the brakes of an automobile to practically the same tension and to permit the adjustment of four-wheel brakes so that the brakes on the two rear wheels may have a stronger tension than those on the two front wheels and any desired degree of difference can be obtained.

Another object of my invention is to provide a brake tester of low cost and rugged construction which can be quickly applied for operation without the use of any tools whatsoever, and one which may be readily used in connection with a rear wheel, with an upward pull, or on a front wheel, with a downward pull.

Another object of my invention is to provide a brake tester having means for connecting it with the outer end of a shaft or the hub of a wheel when making a test during the adjustment of a brake.

A further object of my invention is to so arrange the parts of the brake tester that the line of force used in operating the device will be on the center line of the wheel thereby eliminating side twists and producing a more accurate indication of the strength of the brake.

A still further object of my invention is to provide a brake tester comprising an adjustable hanger, a shoe pivotally connected to the hanger and adapted to engage the tire of an automobile wheel, a handle including a socket pivotally connected with the shoe, sectors also pivotally connected with the shoe and adjustable relative to the handle, a gage carried by one of the sectors and actuated through an operating mechanism controlled by the force applied to the handle against a spring between the shoe and a member connected with the sectors, and means to relieve any extraordinary pressure on the gage during operation of the device.

Further objects of the invention will be apparent from the description of the construction and operation of the device.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1, is a side elevation of a brake tester constructed in accordance with this invention illustrating its application to a rear wheel of an automobile only a portion of which is shown.

Fig. 2, is a plan view of the device with a portion of one of the hanger arms broken away and shown in section to illustrate a detain of construction and the wheel and its tire being shown in section.

Fig. 3, is an enlarged side elevation of one of the sectors and component parts.

Fig. 4, is a plan or top edge view of the dial operating arm or trigger.

In carrying out my invention as herein embodied, 10 represents an automobile wheel provided with the usual tire 11 and adapted to revolve on or with a shaft 12. The hub of the wheel is generally surmounted by a hub cap 13.

An adjustable hanger or link 14 is adapted to engage the end of the shaft, the wheel hub or the hub cap, as the case may be, when the device is in operation and said hanger or link includes two arms 15 and 16 adjustable lengthwise relative to each other. At the outer end of the arm 15 is a gripping element 17 in the form of a hook, ring or the like having an opening of sufficent size to pass over the largest standard hub cap or shaft. The inner end of the arm 15 overlaps a portion of the arm 16 which is provided with a slot 18 for the passage of a bolt 19 or equivalent fastening device, said bolt also passing through the arm 15 and having a nut 20 threaded thereon. The contact surfaces of the arms 15 and 16 are preferably corrugated as at 21 to prevent endwise movement of the hanger arms after the fastening device has been tightened. The head of the bolt 19 is preferably housed in a groove 22 in the inner face of the arm 16.

The opposite end of the arm 16 or the inner end of the hanger as a whole has a pivot pin 23 mounted thereon for pivotal connection with the shoe 24. The shoe 24 includes a tire or wheel engaging element 25, a tail piece 26, a bearing 27 intermediate the ends of the shoe or between the tire engaging member 25 and the tail piece 26, and a hub 28 for a purpose to be presently described.

A handle socket 29 has one end bifurcated for coaction with the hub 28 so that a bolt 30 or other equivalent fastening means passing through the handle socket and the hub 28 pivotally connects said handle socket to the shoe and in addition, said fastening device connects one corner of the sectors 31, similar to bell-crank levers, to the hub of the shoe and the inner end of the handle socket. A bolt 32 is fastened to another end of each of the sectors and carries a rod 33 having a shoulder 33′, said rod passing through the tail piece 26 of the shoe with a spring 34 coiled about the rod 33 and having one end resting against the tail piece and the other end against a castellated nut 35 or a washer 36 interposed between the nut and the end of the spring, said nut being threaded upon the rod and held in the desired adjusted position by a cotter-key 37, a pin or other equivalent. The other corner of each of the sectors is adjustably connected adjacent the outer end of the handle socket, by means of a pin 38 which may be passed through any one of the series of holes 39 in the sectors and through the handle socket. The pin 38 may also be used for holding the handle 40 in its socket where the two are made separate from each other.

On one of the sectors and preferably on the outer face thereof is mounted a pressure gage 41 of ordinary and usual construction and includes a dial 42, a free hand 43, an indicating hand 44, and an operating stem 45 by which the indicating hand is actuated due to inward pressure on the stem 45. The inward pressure is caused by movement of the sector on which the dial is mounted toward the dial operating finger or trigger 46 which finger is provided with a hub 47 so as to mount it upon the bolt or fastening device 30. The hub 47 of the dial operating finger is provided with a rearwardly projecting lug 48 and said lug has a projection 49 at one side thereof.

A rod 50 having a curved portion and provided with an eye 51, at one end is mounted on a bolt 52 through the medium of said eye, and said bolt is carried by the shoe 24 and may be threaded into a boss 53 on said shoe. On the rod 50 is mounted a coil spring 54 with one end engaging a nut 55 and the other end engaging the projection 49 whereby the dial operating finger or trigger 46 is normally held stationary relative to the shoe. In order to adjust the position of the dial operating trigger relative to the shoe, an adjusting screw 56 has threaded engagement with the lug 48 and bears against the bolt 52 so that by screwing the adjusting screw 56 in or out, the dial operating trigger will be rotated for changing its position and this is advantageous when it is desired to reset the indicating hand 44 of the dial by relieving the pressure from or adding pressure to the stem 45.

As above stated, the gage is provided with an indicating hand 44 and a free hand 43 which cooperate through the medium of a pin 57 on the free hand so that when the indicating hand is actuated clockwise, the free hand will be moved with it, but when the indicating hand is released and returns to the zero point, the free hand will remain in the position to which it was carried. After the reading has been taken of the gage, the free hand may be returned to the zero position by the knob 58 which is connected with the free hand and which extends outside of the gage so that it is readily accessible.

The operation of the device is as follows:

The hanger 14 is first adjusted so that when the shoe 24 is brought into engagement with the periphery of the wheel or a tire thereon, the outer end of said hanger will pass over the axle or the hub of the wheel.

The device being applied to the rear portion of the rear wheel of a vehicle, an upward pull on the handle 40 will cause the tire engaging member 25 to firmly contact with said tire so that thereafter the two will move in unison. When further pressure is applied to the handle 40 in an attempt to rotate the wheel against the applied brakes, the spring 34 will be gradually compressed through the medium of the sectors 31, the bolt 32, the rod 33 and component parts. This movement of the sectors and the handle takes place about the trunnion 30 relative to the shoe and since the dial operating trigger 46 is practically stationary relative to said shoe, the dial stem will be moved inward for actuating the indicating hand 44.

From this, it will be obvious that when a brake is locked in a certain position and the wheel jacked off the floor, the amount of pressure required on the handle 40 to slip the wheel under its brake will be accurately registered on the gage 41 due to the compression of the spring 34. It is to be understood that by applying this device to each wheel separately and carrying out the above operation, the frictional resistance of each brake may be readily and quickly determined.

After the pressure on the handle 40 has been released the indicating hand 44 is returned to its normal position in the usual manner, but the free hand 43 remains and registers the amount of pressure required to slip the wheel under its brake and as the brake for each wheel is adjusted, it may be regulated until the free hand is brought to the same position after a test on each brake.

Should the operator adjust the brakes to such an extent, that when pressure is applied to the handle 40, the wheel cannot be made to split under its brake even after the gage has registered its highest indication, then the dial operating trigger 46 will rotate about the bolt 30 against the action of the spring 54 so that the parts will not be broken or otherwise damaged, and then when pressure is relieved from the handle 40, the springs 54 will return the dial operating trigger 45 to its normal position.

In order to use the brake tester on the other rear wheel of an automobile, the hanger 14 and its pin 23 are withdrawn from the shoe 24 and then again inserted from the opposite side of said shoe so that the hanger is always on the outside when the device is in use.

When the brakes are of the four wheel type and it is therefore necessary to adjust those on the front wheels, the device is inverted or turned up side down from the position shown in the drawings as the front wheels should be tested with a downward motion when the shoe is brought into engagement with the front portion of the front wheels which is the most practical way because the mud guards or fenders do not interfere with the operations.

The tire engaging member 25 is preferably V-shaped or has a V-shape groove so that it will readily grip different sized tires and also act on the principle of a wedge, in other words, when pressure is brought to bear on the handle, the tire on the wheel will be wedged into the V-shaped groove, thus providing an extended contact surface.

In using the device a number of separate pulls can be made thereon very quickly by simply moving said handle in an opposite direction which releases the shoe, or more particularly the tire engaging member 25, from the tire. This action is analogous to that of the ordinary pipe wrench. In order to set the handle in a convenient position for the operator, the pin 38 is withdrawn and the handle then adjusted relative to the sectors 31 after which the pin 38 is replaced. This changing of the position of the handle relative to the shoe in no way affects any of the operating parts.

It is to be particularly noted that when the device is in place, the handle and the shoe are on the center line of the tire and therefore, the force will be evenly applied and accurate tests made for the adjustment of the brakes.

Of course I do not wish to be limited to the exact details of construction as herein shown, as these may be varied within the limits of the appended claims without departing from the spirit of my invention.

Having thus fully described my invention, what I claim as new and useful is:

1. A brake tester comprising an elongated hanger, means at one end thereof for connection to the hub of a wheel, a shoe mounted on the other end of said elongated hanger and adapted to engage the periphery of the wheel, means pivotally connected with the shoe to cause said shoe to grip the wheel for rotating said wheel against the action of its brake, means to yieldingly resist the movement of said pivotally connected means, a gage on said pivotally connected means to indicate the force necessary to turn the wheel against its brake, and yielding gage operating means normally in fixed relation to the shoe to actuate said gage when the first mentioned means is moved in that direction which will rotate the wheel.

2. A brake tester for testing the tension of the brake by registering the force necessary to turn a wheel against its brake, comprising an elongated hanger, means at one end thereof for connection with the hub of the wheel, clamping means carried by the elongated hanger to engage the periphery of the wheel with its center on the center line of the wheel, tester operating means pivotally connected with the clamping means also on the center of the wheel, yielding means normally holding the operating means in predetermined relation to the clamping means while permitting movement of the operating means relative to said clamping means when force is applied to said operating means, and means to indicate the force applied to the operating means at the time of turning the wheel against its brake.

3. In a brake tester, a shoe to engage the periphery of a wheel, an operating means pivotally connected with the shoe, means to provide a resilent connection between the operating means and the shoe, an elongated hanger pivotally and detachably connected at one end with the shoe, and provided at the other end with means to connect it to a wheel hub, said elongated hanger comprising two arms adjustably connected together for longitudinal adjustment relative to each other, whereby said elongated hanger may be adjusted to the radii of different sized wheels, means carried by the operating means to indicate the amount of force applied to the operating means to turn the wheel against its brake after the latter has been set and yielding means in the path of travel of the indicating means to actuate the latter.

4. In a brake tester, a shoe for engagement with the periphery of a wheel, operating means pivotally connected with the shoe, means to yieldingly resist movement of the operating means relative to said shoe in one direction and to return said operating means to its normal position after movement, and an elongated hanger pivotally and detachably connected at one end to the shoe and provided at the other end with means to connect it to a wheel hub.

5. In a brake tester for turning a wheel against its brake after the later has been set, means for connection with the hub of a wheel, means pivoted to said first mentioned means and adapted to engage the periphery of the wheel, operating means pivotally connected with the second mentioned means, a spring actuated means adjustably connected to the third mentioned means and associated with said second mentioned means through a spring to yieldingly resist movement of the operating means relative to the second mentioned means, indicating means carried by the spring actuated means, and means interposed between the the indicating means and said second mentioned means to actuate the indicating means due to movement of the operating means.

6. A brake tester comprising an elongated hanger, means at one end thereof for temporarily connecting said elongated hanger to the hub of a wheel, a shoe pivotally connected with the elongated hanger for engagement at one side of its pivot point with the periphery of the wheel, operating means pivoted to the shoe in spaced relation to the pivot point of said shoe with the elongated hanger and for use in turning the wheel against its set brake, including a handle socket, connecting means journalled on the pivotal point of the shoe and the handle socket and attached to said handle socket, and yielding means movably linking the operating means with the shoe on the opposite side of the pivot point from the latter, and means to indicate through the relative movement of the operating means and the shoe the amount of force necesary to turn the wheel against its brake.

7. The structure set forth in claim 6 wherein means is provided to adjustably attach the connecting means to the handle socket.

8. A brake tester comprising an elongated hanger, means at one end thereof for temporarily connecting said elongated hanger to the hub of a wheel, a shoe pivotally connected with the elongated hanger for engagement at one side of its pivot point with the periphery of the wheel, operating means pivoted to the shoe in spaced relation to the pivot point of said shoe with the elongated hanger including a handle socket, sectors journalled on the pivotal point of the shoe and the handle socket said sectors having a series of holes therethrough, means selectively registering with any of said holes and passing through the handle socket to adjustably connect the sectors with said handle socket and yielding means movably linking the sectors with the shoe on the opposite side of the pivot point from the latter, a gage carried by one sector, and means journalled on the same axis as the sectors and co-operating with the gage and a portion of the shoe to actuate the gage when the operating means is moved against the action of the yielding means in applying sufficient force to turn the wheel against its brake at a predetermined setting.

9. The structure set forth in claim 8 in connection with spring controlled means to normally hold the gage actuating means in fixed relation to the shoe but permitting rotation thereof after the gage has indicated its full capacity.

10. A brake tester comprising an elongated hanger, means at one end thereof for temporarily connecting said elongated hanger to the hub of a wheel, a shoe pivotally connected with the elongated hanger for engagement with the periphery of the wheel, a tail-piece carried by the shoe, operating means pivoted to the shoe in spaced relation to the pivot point of said shoe with the elongated hanger, including a handle socket, sectors journalled on the pivotal point of the shoe and the handle socket, said sectors having series of holes therethrough, means selectively registering with any of said holes and coacting with the handle socket to adjustably connect the sectors with said handle socket, a shouldered rod pivotally connected with the sectors and passing through the tail-piece, a spring on said rod with one end in engagement with the face of the tail piece opposite the rod shoulder and means adjustable on said rod and engaging the opposite end of the spring to regulate the tension thereof, means on one of the sectors to indicate the amount of force applied to the operating means and against the action of the spring to cause the shoe to grip the wheel with sufficient friction to turn said wheel against a set brake, and yielding means in the path of travel of the indicating means to actuate the latter.

11. The structure set forth in claim 10 wherein the indicating means consists of a gage mounted on one of the sectors and includes a dial, an indicating hand, a free hand moved only forwardly by the indicating hand, a knob for manually moving said free hand in a reverse direction, and a stem for actuating the indicating hand, a trigger coacting with the gage stem, a hub by which the trigger is carried journalled on the pivotal point of the shoe and the operating means, a projection on the hub extending oppositely to the trigger, a stop carried by the shoe, a set screw having threaded connection with the projection and coacting with the stop to limit movement of the trigger in one direction, a lug on the projection, a curved rod connected to the stop and passing through the lug, spring holding means adjustably mounted on the free end of said curved rod, and a spring on the curved rod in engagement with the holding means and the lug to normally hold the trigger in a fixed position relative to the shoe while permitting rotation of said trigger after the dial has indicated its full capacity.

12. In combination, an elongated hanger having means at one end for connection with a wheel hub, a shoe pivoted to the opposite end, an operating handle pivoted to the shoe, sectors journalled on the pivotal point of the handle and the shoe, means to adjustably connect said sectors to the handle, means to resiliently connect the sectors with said shoe, a gage mounted on one of the sectors to indicate the force necessary to turn the wheel against its brake, gage operating means journalled on the pivotal point of the sectors and coacting with the gage, and means yieldingly connecting the gage operating means to the shoe.

In testimony whereof, I have hereunto affixed my signature.

DAVID F. GRAHAM.